United States Patent [19]

Adams et al.

[11] Patent Number: 5,184,330

[45] Date of Patent: Feb. 2, 1993

[54] MULTI-BEAM SONAR FISH DETECTION APPARATUS PROVIDING REAL-TIME THREE-DIMENSIONAL WIRE-FRAME DISPLAY REPRESENTATION

[75] Inventors: James W. Adams, Eufaula; Louis S. Loving, Clayton; David A. Betts, Eufaula; David P. Donnelly, Eufaula; Alvin Nunley, III, Eufaula, all of Ala.

[73] Assignee: Techsonic Industries, Inc., Lake Eufaula, Ala.

[21] Appl. No.: 720,644

[22] Filed: Jun. 25, 1991

[51] Int. Cl.[5] ............................................. G01S 15/96
[52] U.S. Cl. ........................................ 367/111; 367/88
[58] Field of Search ......................... 367/111, 88, 908

[56] References Cited

U.S. PATENT DOCUMENTS

| | | | |
|---|---|---|---|
| 3,273,148 | 9/1966 | Wood et al. | 367/88 |
| 4,088,979 | 5/1978 | Jones et al. | 367/88 |
| 4,873,676 | 10/1989 | Bailey et al. | 367/98 |
| 4,879,697 | 11/1989 | Lowrance | 367/111 |

OTHER PUBLICATIONS

Bass Pro Shops Catalog; Springfield, Mo. 65898-0001; 1990; Last page.
Bourne, "How the Microchip Made Fish-Finders Smarter", *Fishing Tackle Retailer Magazine*, Feb. 1985, pp. 57-61.

*Primary Examiner*—Daniel T. Pihulic
*Attorney, Agent, or Firm*—Needle & Rosenberg

[57] ABSTRACT

A sonar depth sounder system is provided in which a plurality of elements are combined to form a sonar transducer capable of generating a plurality of narrow overlapping beams and receiving sonar echoes. The sonar return information is filtered, amplified through a log converter, digitized and then analyzed by a high-speed microprocessor. This analysis stage combines information obtained from each one of the plurality of sound beams generated by the transducers, determines correct target location and size, distinguishes fish from other targets such as thermoclines or structure based on heuristic algorithms and provides an output data set for display. Representations of three-dimensional submerged structures are presented in a variety of formats to the user, including utilizing a grid line display of the contour of the bottom surface and location lines from displayed fish above the surface to grid lines on the bottom surface display.

7 Claims, 12 Drawing Sheets

MULTI-BEAM SONAR FISH DETECTION APPARATUS PROVIDING REAL-TIME THREE-DIMENSIONAL WIRE-FRAME DISPLAY REPRESENTATION

MICROFICHE APPENDIX

The software portion of the present invention is incorporated herewith via a single microfiche appendix containing 15 frames.

TECHNICAL FIELD

The present invention relates generally to sonar apparatus for fishing, boating, and depth sounding and more particularly relates to a multi-beam sonar fish detection apparatus providing a real time three dimensional wire frame display representation of underwater environment. Specifically, the present invention relates to an improved sonar depth sounder having improved display characteristics which facilitate target detection, review of target data from previous sonar returns, scale expansion of selected areas on the display, automatic bottom detection and fill-in, automatic display scale change, display reformatting in response to scale changes, and the like.

BACKGROUND OF THE INVENTION

Sonar devices are frequently used by sport fisherman and boaters. These devices include means for generating high-frequency sound pulses and receiver/transducer means responsive to reflected sound pulses for acquiring target data such as the location of fish and underwater obstacles, and the depth of the bottom of the body of water. Typically, the sonar apparatus generates a series of pulses of sound at periodic intervals, receives reflected sound pulses or echoes from underwater objects, and displays either a depth readout of a target or the location of a target on a linear or curvilinear array scaled as to depth, which is a function of the time elapsed between the transmission of the sound pulses until reception of the reflected echo.

All fish finders consist of two main components, the transducer and the display head. Transducers, when activated by their associated transmitter circuits, send out ultrasonic pressure waves in an expanding pattern that can be simply expressed as a cone-shaped beam. Traditionally, sonar designers have been faced with a choice between wide viewing angle and high resolution.

A wide cone angle beam will cover a large viewing area and consequently aid in finding fish. However, there are certain disadvantages inherent in the use of wide cone angles. In particular, holes or drop-offs may be missed when the beam is wider than the hole or drop-off. Fish in a hole or along a drop-off will not be detected where the beam is wider than the hole or drop-off. Similarly, fish that are around submerged structure will be hidden unless they are above the peak of the structure. Also, wide beam target detection does not provide target placement within the beam, so that the user does not know where the fish is in relation to the boat.

A narrow cone angle beam will provide good detail of fish and underwater structure. However, in order to provide this detail, the viewing angle may be reduced by one-half or more.

Another problem found with existing fish finders is in determining target size. Since the strength of a sonar return is a function not only of target size but also of where the target is in the beam, a fish on the outer edge of the beam will appear smaller than if it were in the center of the beam. Similarly, a fish some distance from the transducer will appear smaller than if it were closer.

Another deficiency of previous fish finding systems is that the information transfer bandwidth between system and user is limited by primitive display formats. The two-dimensional displays of previous systems only provide a narrow slice of bottom structure information directly below the transducer. Therefore, slopes, channels or drop offs located to either side of the boat are not detected by the previous systems which use a single, narrow-width beam.

In prior art depth sounders, various methods are used to display the reflected sound pulses or "sonar returns" as a function of depth. Rotating disk lamps or "flashers", chart recorders, and numerical digital depth readouts are commonly employed to indicate the depth of a sonar return. These types of displays suffer from various disadvantages which are either inconvenient or annoying to a user.

One problem with many prior art apparatus is that a user must interpret the display to determine the bottom of the body of water since the display is typically a linear or curvilinear scale which extends to the extent of the capability of the apparatus. The bottom return in some devices such as chart recorders typically appears as a wide area or band on the display, but conditions such as thermocline and multiple returns caused by reflection from the boat bottom or other sources create additional sonar returns indicated as occurring at depths above or below the actual bottom, tending to make interpretation more difficult.

Some prior art linear or curvilinear displays such as flashers are only one-dimensional, in that the linear or curvilinear display can only display information for a single transmission. A sonar return subsequent to a currently-displayed return is erased or overwritten by new information. If a moving target is detected, the target such as a fish may disappear from the display after the next transmission, and the user may miss the target if the display has not been constantly watched.

In order to overcome the disadvantages of a one-dimensional display, other prior art sonar apparatus employ a chart-printing device or a cathode ray tube (CRT) to provide a two-dimensional display which lowers the risk of missing targets. Some of these devices include scale-changing features which allow different depth scales to be selected and associated with the display. However, when a scale change is made, a discontinuity at the point of the scale change makes interpretation of the display difficult. For example, if a target is detected at 15 feet on a 60-foot nominal scale, and the scale of the display is changed to 120 foot nominal depth, the previously detected target at 15 feet will remain in the same relative position on the display, since the device cannot go back and "rewrite" what has previously been written. However, new returns for the same target at 15 feet will appear at a different location on the display in the 120 foot nominal depth scale. Thus, the target will appear to have shifted upwardly on the display. Discontinuities such as these create confusion in display interpretation.

Some prior art sonar apparatus include a scale expansion feature wherein the depth scale is expanded by a predetermined factor of two. Other prior art devices include a scale expansion feature wherein an upper depth limit and a lower depth limit are keyed into the device, so that target data detected within these depth limits can be expanded to fill the display. Still other types of displays include prepicked scale expansion regions having a fixed number of fixed limit expansion regions.

All of these prior art approaches to display expansion are subject to criticism. The predetermined factor of two approach, while simple, cannot be used to "zero in" on a selected area for expansion. The selectable upper and lower limit approach requires the user to enter the limit data via a keypad, requiring mental calculations to determine the appropriate areas for display expansion. The prepicked expansion region approach suffers when a target of interest lies close to a boundary between expansion regions, so that selection of one expansion region followed by movement of the target requires the user to re-enter the expansion selection mode and select another expansion region.

Other problems exist in prior art sonar apparatus. A particular problem occurs in sonar apparatus having automatic gain control For example, previous systems have disclosed an apparatus wherein a microprocessor controls the gain of the receiver stage so that the gain of the receiver is automatically increased as the anticipated bottom depth increases. In this apparatus, the gain is set at a minimum at the time of and immediately succeeding a sonar transmission and as time increases, the receiver gain is increased in anticipation of weaker signals which correspond to greater depths.

A particular problem with variable gain amplifier circuits in that changing amplifier gain often creates transients which if not properly handled can appear as target returns. Typically, additional filters or other signal processing circuits are required to suppress the transients or otherwise assure that the transients are not treated as a valid return signal.

Moreover, troubleshooting of variable gain amplifiers is difficult in that a repair technician is required to have detailed information as to expected outputs for a wide range of input signals. This typically entails employing a variety of input signal settings and adjustments in order to isolate a particular faulty component in a variable gain amplifier.

Another problem frequently encountered in marine sonar apparatus is providing a watertight enclosure to protect the electrical circuitry which still allows a convenient user interface. Individual waterproof switches are expensive and are still prone to leaks in that a separate seal for each of a plurality of switches increases the probability that one or more of the switch seals will fail under adverse climatic conditions. Significant improvement in weatherability could be obtained by minimizing the number of places requiring weatherproof seals.

Therefore a need exists for a sonar fish detection apparatus capable of overcoming the above-discussed shortcomings of traditional systems.

Accordingly, it is an object of the present invention to provide novel sonar data collection, user interfaces and display formats that permit the user to more accurately comprehend the underwater environment.

It is an object of the present invention to provide a wide viewing angle simultaneously with detailed target resolution and fast bottom area coverage by providing multiple simultaneous sonar beams with a relatively small transducer.

It is a further object of the present invention to provide target size normalization in both depth and lateral planes.

It is a further object of the present invention to display multiple targets and bottom contours for the user on a real-time basis.

It is a further object of the present invention to distinguish targets from thermoclines and submerged structures on a real-time basis.

It is a further object of the present invention to provide a built-in means for interactively training an operator to use the sophisticated features of the invention.

It is a further object of the present invention to achieve minimum beam-to-beam acoustic interference through use of an optimally selected shape and material for the ceramic elements along with transducer and receiver multiplexing.

It is a further object of the present invention to achieve minimum beam-to-beam electrical interference through the use of shielded cable design, circuit design and board layout.

It is a further object of the present invention to achieve precise beam aiming so that the desired level of overlap occurs. Beam overlap eliminates dead spots in the coverage and allows accurate determination of target placement by means of the ratio of sonar target strength present in two adjacent and overlapping beams.

SUMMARY OF THE INVENTION

The present invention overcomes these and other problems in prior art sonar depth sounder apparatus and displays therefor by providing an improved microprocessor-driven sonar apparatus comprising a multiple-element transducer and a super twist liquid crystal display (LCD) screen for displaying sonar target data in either a two-dimensional or a three-dimensional depiction. Target data are digitized and stored in an addressable memory. When in the two-dimensional display mode, the apparatus includes features such as automatic bottom detection and display fill-in below the detected bottom. Automatic display scale changing is provided in response to the detected bottom going off-scale, or in response to the detected bottom rising to within a predetermined depth.

One of the most important features of the present invention is the unique utilization of multiple elements within the transducer of a sonar depth sounder apparatus. The particular processing used to evaluate the pulse return data becomes a more critical aspect of the apparatus if more than a single element is simultaneously activated within the transducer. Also, the specific physical positioning of the individual elements within the transducer demands direct attention to allow for precise beam aiming to ensure overlap, eliminate dead spots in coverage and provide for three-dimensional, high-resolution imaging.

Furthermore, the utilization of multiple elements within the transducer requires that each of the individual elements exhibit good side lobe performance in order to minimize the beam-to-beam interference. The particular ceramic material used to manufacture each element as well as the specific geometric shape of each element are determining factors with regard to the establishment of good side lobe performance. One other area of concern in the use of multiple elements is the overall size of the transducer since the consumer would be reluctant to install a transducer on his boat that was inordinately large or bulky. Therefore to conserve space, an operating frequency of 455 KHz has been chosen for the elements to take advantage of the principle that elements are physically smaller at higher frequencies for a given beam pattern. The industry standard for operating frequency within the sports fishing market is 200 KHz.

In the preferred embodiment, the transducer means includes six ceramic elements. The present invention utilizes a carrier which allows the individual elements to be laid in at angles instead of flat. In the preferred embodiment of the present invention, the individual elements are electronically connected and microprocessor controlled such that two transmitter channels and three receiver channels are utilized to generate, transmit and receive the various sonar pulses emitted from the multiple elements within the transducer.

The present multiplexed transmit and receive cycle mentioned above wherein two transmitters and three receivers are used eliminates the need for four additional transmit circuits and three additional receive circuits as would be required to directly electrically connect and control six individual elements. By reducing the amount of circuitry required to adequately connect the multiple elements, the size of the electronic head of the apparatus maintains its compactness so that it may easily fit on the dash of a boat. Such a configuration allows the depth sounder apparatus to process more than six times the amount of sonar data than the normal single element depthfinders, without having to house and maintain six times the electronics. Furthermore, since the present invention includes the development of algorithms and processing techniques which allow the use of a single microprocessor system, additional microprocessors with all the related hardware such as memory devices, address latches, etc., are not required even though multiple elements are generating sonar data for processing.

Of particular significance in the present invention is the feature of total display reformatting or rescaling in response to a scale change or selection of a display expansion mode. Even prior displayed target data from prior sonar returns is updated or reformatted to relate to the new depth scale, thereby eliminating discontinuities in the display. Target data from such prior returns is recalled from memory and rescaled, and the entire screen is changed to correspond to the new depth scale.

A variably positionable zoom or expansion region is provided which allows selection of an area of interest, for range expansion and closer inspection. Additionally, an improved switch construction minimizes the number of weathertight seals and reduces the probability of leaks due to inclement weather.

More particularly described, the present invention comprises a sonar echo ranging depth sounder apparatus including sonar pulse generating means and transducer means responsive to reflected sonar pulses for acquiring target data representative of reflected sonar pulses. An addressable memory stores a plurality of reflected target signals in a plurality of addressable locations. A control circuit, a programmed microcomputer in the preferred embodiment, is responsive to store target signals from the memory for display.

A super twist liquid crystal display (LCD) screen comprising a matrix of addressable picture elements ("pixels") is responsive to retrieved target signals provided by the control circuit to display the retrieved target signals at locations on the display which correspond to a selected one of a plurality of depth scales. The retrieved target signals may be displayed in one of three different display formats, referred to herein as three-quarter (¾) view, front view and traditional two-dimensional view. The display is responsive to simultaneously display a plurality of retrieved target signals corresponding to a plurality of prior sonar signal returns.

All data displayed on the screen in any one of the selected display screen modes is associated with a particular selected depth scale. A different display scale may be selected either manually or automatically by automatic bottom tracking means. The present invention further comprises scale changing means responsive to a scale reselection to reformat all displayed information to associate the entire display screen with the new depth scale. In particular, the apparatus of the preferred embodiment is responsive to detect the bottom of the body of water, and automatically select a deeper scale when the detected bottom goes "off scale". The entire display screen is then reformatted to reflect the new, deeper scale.

In the preferred embodiment, when the detected bottom rises to within a predetermined depth, the next shallower scale is selected, and the entire display is reformatted to reflect the new, shallower depth scale.

When in the two-dimensional mode, the present invention further comprises display bottom fill-in means responsive to the detected bottom to fill in or "paint" areas of the display below the detected bottom. This eliminates ambiguities in the display resulting from multiple echoes or thermoclines which sometime make display interpretation more difficult.

The present invention also comprises means for selecting a predetermined portion of displayed target data for expanded display or "zoom". The selectable portion corresponds to a variably positionable "zoom" or expansion region, which may be positioned by the operator at varying depths to select an area of interest for display expansion. Upon selecting the zoom mode, the display expands only the portion of target data within the zoom region depths, and reformats the entire display screen to correspond to the depth range of the zoom region. In addition, while in the zoom mode, an operator can move the expanded region shallower or deeper.

Still more particularly described, the addressable memory employed in the disclosed embodiment stores target return data for the entire operable range of the apparatus. For example, in one disclosed embodiment the operable range is 120 feet of depth; target data for every three inches of depth down to 120 feet are stored in memory. In this disclosed embodiment, six different depth scales may be selected for viewing this data (10 feet, 20 feet, 40 feet, 60 feet, 80 feet and 120 feet). When a particular depth range or scale is selected, the portion of stored data corresponding to target data within the selected depth range is displayed. Accordingly, and although a user may be viewing data at a 20 foot depth scale or may be viewing an area of interest in the zoom mode, sonar returns for targets as deep as 120 feet are being stored in memory, and can be recalled from memory and displayed in response to selection by the operator of the 120 foot depth scale or upon leaving the zoom mode. Therefore, the present invention minimizes the likelihood of missing targets.

DETAILED DESCRIPTION

The preferred embodiment of the present invention is now described with reference to the figures wherein like numerals represent like components throughout.

Figure 1:
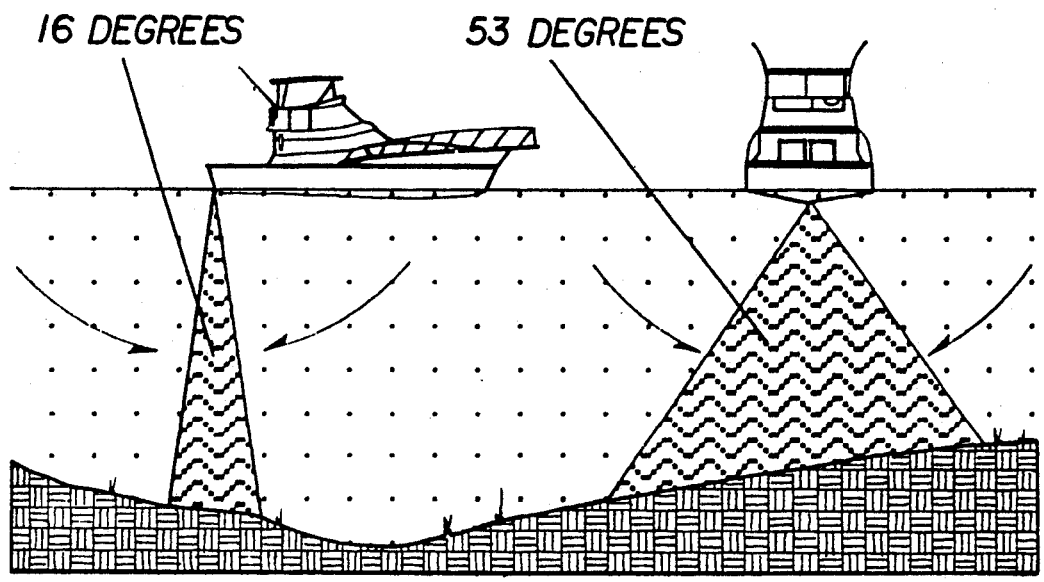
FIG. 1 illustrates a side view and back view of the area of coverage of the sonar signals of the preferred embodiment of the present invention.

The overall area of coverage of the sonar depth sounder of the present invention is illustrated in FIG. 1. The depth sounder uses the basic principles of sonar technology to reveal, locate and identify objects located beneath the surface of the water. A multiple element transducer is used to provide a fan-shaped signal which creates an elongated area at coverage which is very wide side-to-side (approximately 53 degrees) but very narrow front-to-rear (approximately 16 degrees), as shown in FIG. 1.

The advanced technology of the depth sounder of the present invention also uses the various returns from the multiple elements of the transducer to accurately identify the size of a fish, regardless of where the fish is located within the area of coverage. Precise aiming of the various beams produced by the individual elements so that the paths of the beams overlap allows accurate fish placement within the area of coverage by using the ratio of sonar target strength present in two adjacent and overlapping beams. The overlapping beams configuration also assures that there exists no dead spots in the desired area of coverage.

Figure 2:
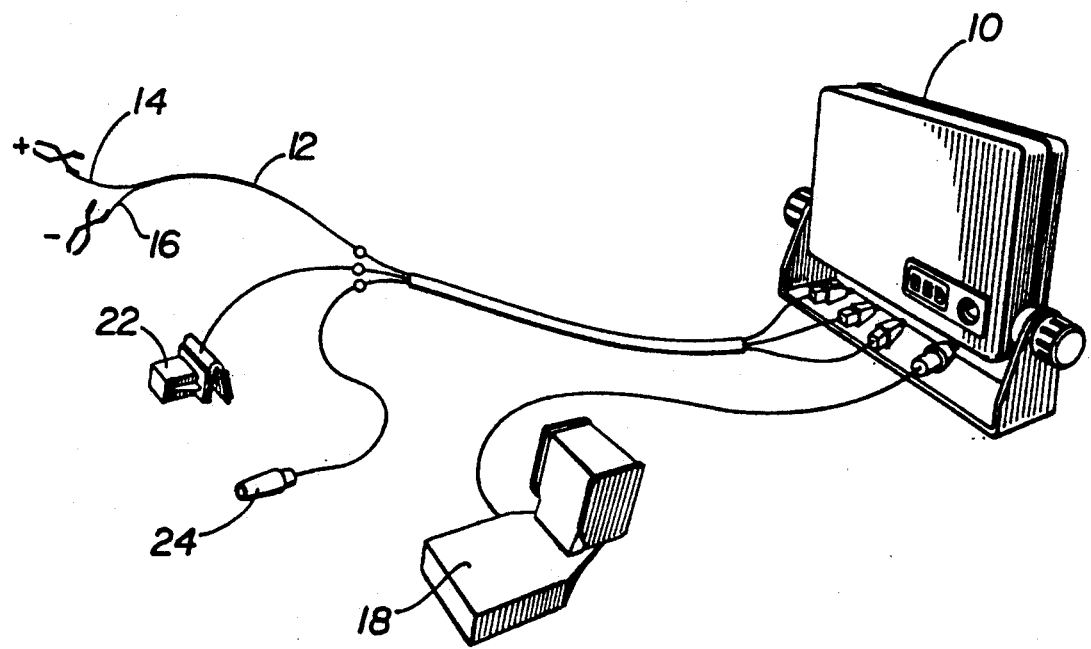
FIG. 2 illustrates the individual hardware components of the present invention.

FIG. 2 illustrates the various components of the sonar depth sounder system of the present invention. The electronic head unit 10 of the system is mountable on the dash of the boats by means of a gimbal bracket and includes the microprocessor and display screen for the system. As indicated by FIG. 2, power is supplied to the electronic head unit 10 via electric cable 12. The power supply cable 12 has a positive lead 14 and negative lead 16 designed to be used with a standard 12 volt DC electrical system (not shown). The sonar depth sounder of the present invention uses a transducer 18 which, due to its multi-element configuration, allows for the unique three dimensional viewing feature provided by the present invention. The sonar signals sent through the transducer 18 is carried to the electronic head unit 10 via cable 20 with the sonar signal being constantly updated at a rate of up to 4 times per second to give an accurate view of the bottom surface of the body of water as well as objects located beneath the surface of the water. The specifics of the transducer will be discussed in greater detail below. Additional external devices connectable to the electronic head unit 10 for use in the sonar system of the present invention include a trolling speed indicator 22 for providing accurate speed readings of all levels, as well as distance back in the display screens, as well as a temperature probe 24 for providing surface water temperature readings, both of which may be displayed on the screen.

The sonar transmitter/receiver circuitry of the present invention consists of two transmit circuits, three receive circuits and a transducer with six ceramic elements. By multiplexing these circuits, acoustic beam interaction can be minimized and four transmitters and three receivers can be eliminated.

Figure 3:
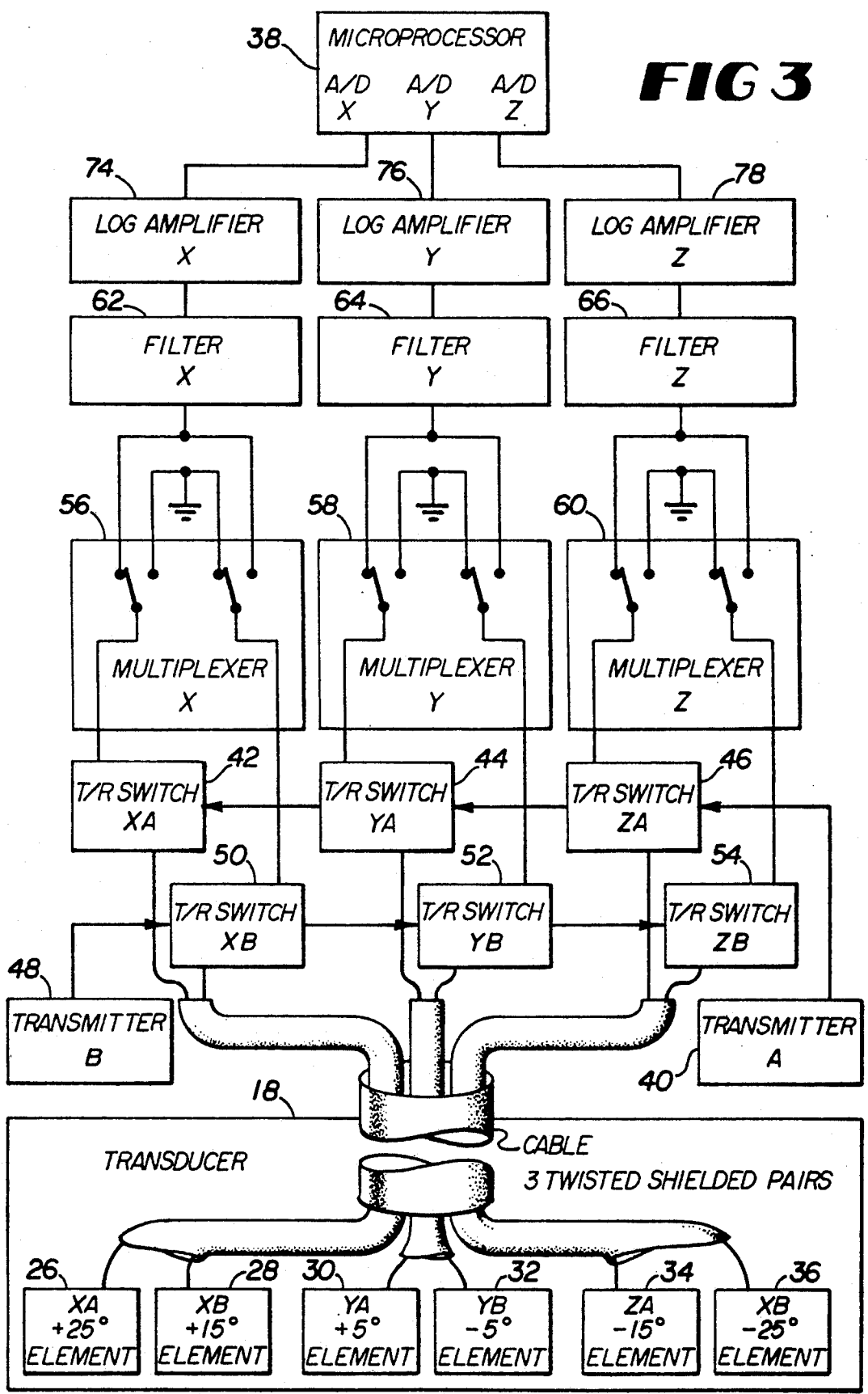
FIG. 3 is a blocked electrical schematic of the sonar portion of the present invention.

FIG. 3 illustrates the particular transmit and receive circuitry used in the preferred embodiment of the present invention to connect the six individual elements 26, 28, 30, 32, 34, 36 within transducer 18 to the microprocessor 38 within electric head unit 10.

The six ceramic elements of the preferred embodiment are divided into two groups. Elements 26, 30 and 34 are included in the A signal/transmission group and are connected to Transmitter A, item 40 in FIG. 3, through transmit/receive switches 42, 44 and 46 respectively. Elements 28, 32 and 36 are included in the B signal/transmission group and are connected to Transmitter B, item 48 in FIG. 3, through transmit/receive switches 50, 52 and 54 respectively.

The Group A elements 26, 30 and 34 are simultaneously energized by Transmitter A 40 while the elements of Group B are simultaneously energized by Transmitter B 48. The groups of elements, A and B, are energized one group at a time for a period of approximately 10–100 microseconds. There is an inter-transmit cycle of approximately 50 milliseconds in the preferred embodiment of the present invention.

In addition to the two transmit channels above, the preferred embodiment of the present invention includes three receiver channels, namely Receiver X, Receiver Y and Receiver Z. One receiver channel is assigned to each element of the group, A or B, presently active. Therefore, in the configuration of the preferred embodiment, each receiver channel X, Y and Z has two of the elements connected thereto. Therefore, for example elements 26 and 28 are connected to receiver channel X, while elements 30 and 32 are connected to receiver channel Y, and elements 34 and 36 are connected to receiver channel Z.

Each of the receiver channels X, Y and Z include a multiplexer 56, 58 and 60, respectively, a filter 62, 64 and 66, respectively, a logarithmic amplifier 74, 76 and 78, respectively as well as a single analog-to-digital converter for processing signals received from any of the three receiver channels. The analog-to-digital converter is shown in FIG. 3 as part of microprocessor 38. To complete the electrical component configuration of the present invention as illustrated in FIG. 3, it should be noted that each multiplexer 56, 58 and 60 is electrically operative with a pair of the transmit/receive switches 42, 44, 46 and 50, 52, 54 and a pair of the individual elements 26, 28, 30, 32, 36 of the transducer 18. Multiplexer 56 of receiver channel X is electrically coupled to transmit/receive switches 42 and 50 and elements 26 and 28. Multiplexer 58 of receive channel Y is electrically coupled to transmit/receive switches 44 and 52 and elements 30 and 32. Multiplexer 60 of receive channel Z is electrically switches 46 and 54 and elements 34 and 36.

Since the operation of each of the receiver channels. X, Y and Z are identical, only one of the receiver channels will have its operation discussed in detail herein. With specific regard to receiver channel X, multiplexer 56 is used to select between elements 26 and 28 as to which one is the proper element to be used as input to the receiver. The particular element not selected to be used in the receiving process at the present time is connected to ground by multiplexer 56 as shown in FIG. 3. Therefore, during the time periods when the sonar signals affiliated with element 26 of the transducer 18 are desired to be processed, the receiver channel X consists of element 26, transmit/receive switch 42, multiplexer 56, filter 62 and logarithmic amplifier 74 before entering microprocessor 38 for processing. The situation described above is shown in operation in FIG. 3. On the other hand during the other portion of the cyclical energization of elements 26 and 28, the sonar signals affiliated with element 28 are desired to be processed. During this latter situation, receive channel X consists of element 28, transmit/receive switch 50, multiplexer 56, filter 62 and logarithmic amplifier 74 before the sonar signals are digitized and processed by the microprocessor 38.

As stated earlier, from an operational standpoint, receiver channels X, Y and Z are identical, therefore, a separate transmitter and receiver channel could be used for each of the six elements. In other words, six transmitter and six receiver channels incorporating six logarithmic amplifiers, six different filters and six analog-digital converters could conceivably be used. However, to eliminate duplicative hardware devices, the configuration shown in FIG. 3, which multiplexes two transmitter and three receiver channels, is desired thereby eliminating four transmitters and three receiver channels.

Various principles and designs are incorporated in the preferred embodiment to enhance the operational accuracy and effectiveness of the sonar depth sounder. For example, to eliminate cross-talk interference which may occur between the two particular elements combined within the same receiver channel, the appropriate multiplexer connects the particular element to electrical ground when sonar signals affiliated with that element are not being processed. In addition, the output of each multiplexer 56, 58 and 60 is connected to a piezoelectric 455 KHz filter 62, 64 and 66, respectively, to help eliminate band noise from the sonar signal to be processed. The filtered output is then amplified, basebanded and logarithmically converted by a single intermediate frequency amplifier integrated circuit 74, 76 and 78 with a Receive Signal Strength Indicator (RSSI). The RSSI function compresses the 70 db dynamic range of the filtered sonar signal to be processed into a 0 to 4 volt output signal. This 0 to 4 volt signal is input to the microprocessor 38 via the analog-to-digital converter associated within the appropriate receiving channel, where the analog signal is converted to a digital signal prior to further processing.

With regard to the physical construction and structure of the printed circuit boards used in the preferred embodiment of the present invention, physical layout techniques are utilized to minimize cross-talk in the unit from interfering with the simultaneously operating receiving circuits. Furthermore, ground planes on the board are used to isolate each receiver from the surrounding environment. The wires from each of the six transmit/receive switches 42, 44, 46, 50, 52, 54 to the associated elements 26, 28, 30, 32, 34, 36 respectively within transducer 18 are run as individually shielded twisted pairs as shown in FIG. 3. Due to the use of two transmitters to cyclically energize the six transmit/receive switches 42–54, diode-type switching is used to keep the individual element return information from being mixed by the common transmitter A 40 or B 48.

Figure 4:
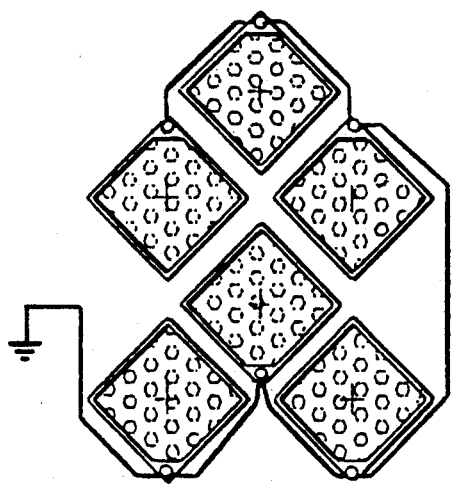
FIG. 4 illustrates the ground connection of the individual elements within the transducer of the present invention.
Figure 5:
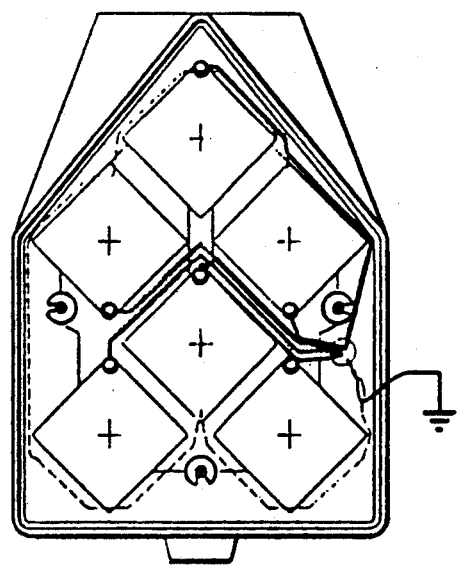
FIG. 5 illustrates the electrical connection of the individual elements within the transducer of the present invention.
Figure 6:
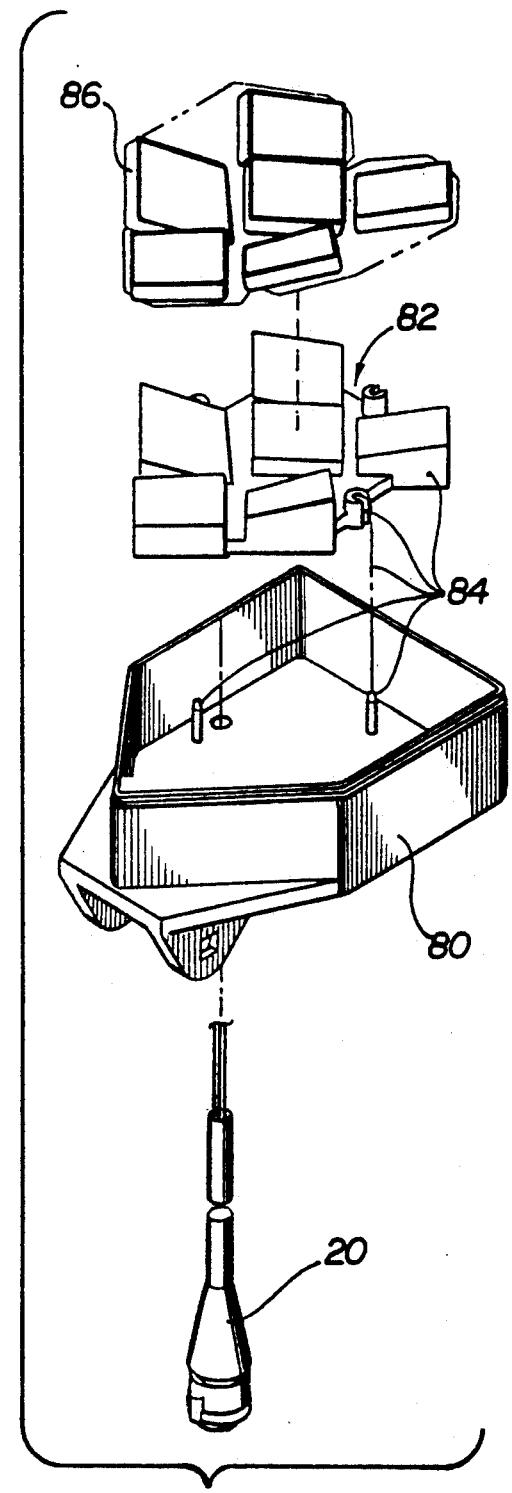
FIG. 6 is an expanded structural view of the transducer of the present invention.

FIGS. 4–6 illustrate the desired shape and orientation of the six individual ceramic elements. FIG. 4 demonstrates the ground connection order of the elements from a bottom view. A top view of the ground connection order of elements is illustrated in FIG. 5.

FIG. 6 sets forth the particular structural orientation of the transducer assembly 18. The cable assembly 20 is securable to the transducer housing 80. In the preferred embodiment of the present invention, the transducer housing 80 is pentagon shaped due to the particular structural orientation chosen for the individual elements in the embodiment. However, it should be noted that the transducer housing 80 may be constructed in any number of shapes based on the overall orientation of the elements and other environmental considerations.

The transducer 80 partially encases and supports a transducer carrier 82 as shown in FIG. 6. The transducer carrier 82 is attached to the transducer housing 80 by a press-fitted, post-type arrangement depicted by item 84. The transducer carrier 82 is constructed so as to support and maintain each of the elements at their desired orientation. With a reference axis running along the line of travel of the boat, the preferred embodiment incorporates a transducer carrier 82 which positions elements 26 and 36 to operate at +25° and −25°, respectively. Elements 28 and 34 are set to operate at +15° and −15°, respectively. Elements 30 and 32 are set to operate at +5° and −5°, respectively.

An acoustic absorber 86 is positioned in association with the individual elements to establish proper boundary conditions for efficient transducer element operation. Each of the elements 26, 28, 30, 32, 34, 36 in conjunction with the acoustic absorber 86 are then positioned onto the transducer carrier 82 and in turn secured into the transducer housing 80. The transducer housing 80 provides protection from environmental hazards inherently encountered when the transducer 18 is attached to the bottom of a boat and submerged into the water.

The particular configuration of square ceramic elements shown in FIGS. 4–6 are specifically designed for shallow (up to 120 ft deep) waters. For deeper bodies of water, a slightly different embodiment is desirable. The different deep-water embodiment has the same general layout as shown in FIGS. 4–6 except that the middle two ceramic elements are not square-shaped as shown but are circular in shape. In addition, instead of operating at 455 KHz as disclosed in the preferred shallow water embodiment, the two circular elements operate at 200 KHz.

The ceramic elements are square and comprised of lead zirconate titanate (PZT). The square elements provide good side lobe performance on the diagonals, i.e. more than 25 dB down. A frequency of 455 KHz was chosen for the elements in the preferred embodiment because element size is inversely related to frequency. By increasing the transmitter frequency from the conventional 200 KHz, the six elements are reduced sufficiently in size such that a six element transducer approximately the size of a 200 KHz single-element transducer is produced.

As stated earlier, precise beam aiming to ensure overlap, eliminate dead spots in coverage and provide for three-dimensional, high-resolution imaging, is achieved by the physical placement of the square ceramic elements. The particular physical orientation of the individual elements in the preferred embodiment of the present invention is best illustrated by FIGS. 4–6.

The sonar return information is filtered, amplified through a log converter, digitized and then analyzed by a high-speed microprocessor. This analysis stage combines information obtained from each one of the plurality of beams, determines correct target location and size, distinguishes fish from other targets such as thermoclines or a structure based on heuristic algorithms, and provides an output data set for the display processing algorithms.

The Information Processing Section (IPS) of the present invention is controlled by a single microprocessor. This microprocessor analyzes the digitized sonar return information, controls display processing and runs the system self-test. The exact software used to analyze and display the information gathered from the sonar signals of the various elements of at the transducer 18 is disclosed in Appendix I contained herein.

The system provides three-dimensional type display images which represent the underwater environment. The particular software used by the present invention is particularly set forth in Appendix I of this disclosure due to the length of the program, it is submitted herewith in microfiche form. The particular features performed by the software are briefly discussed below.

OPERATION

Figure 7:
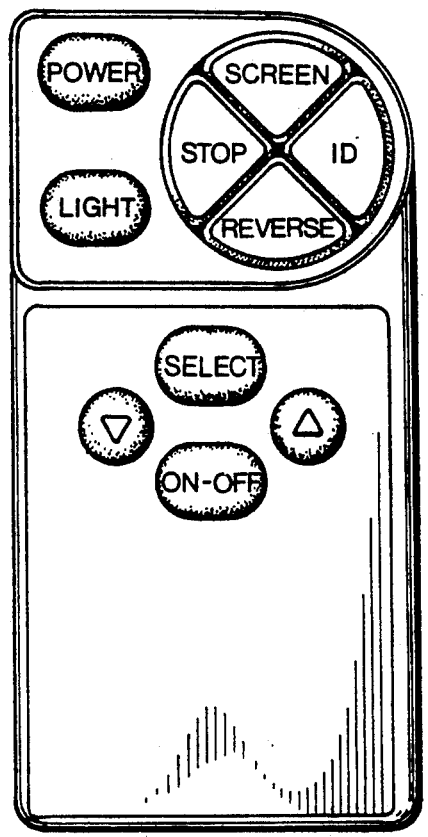
FIG. 7 illustrates the control panel of the present invention.

The sonar depth sounder of the present invention offers a variety of functions which are selectable from a collection of buttons found on the front panel of the electronic head unit 10. The particular arrangement of these selection buttons is illustrated in FIG. 7. By pressing the SCREEN control buttons, an operator may control the display of underwater images.

Figure 8:
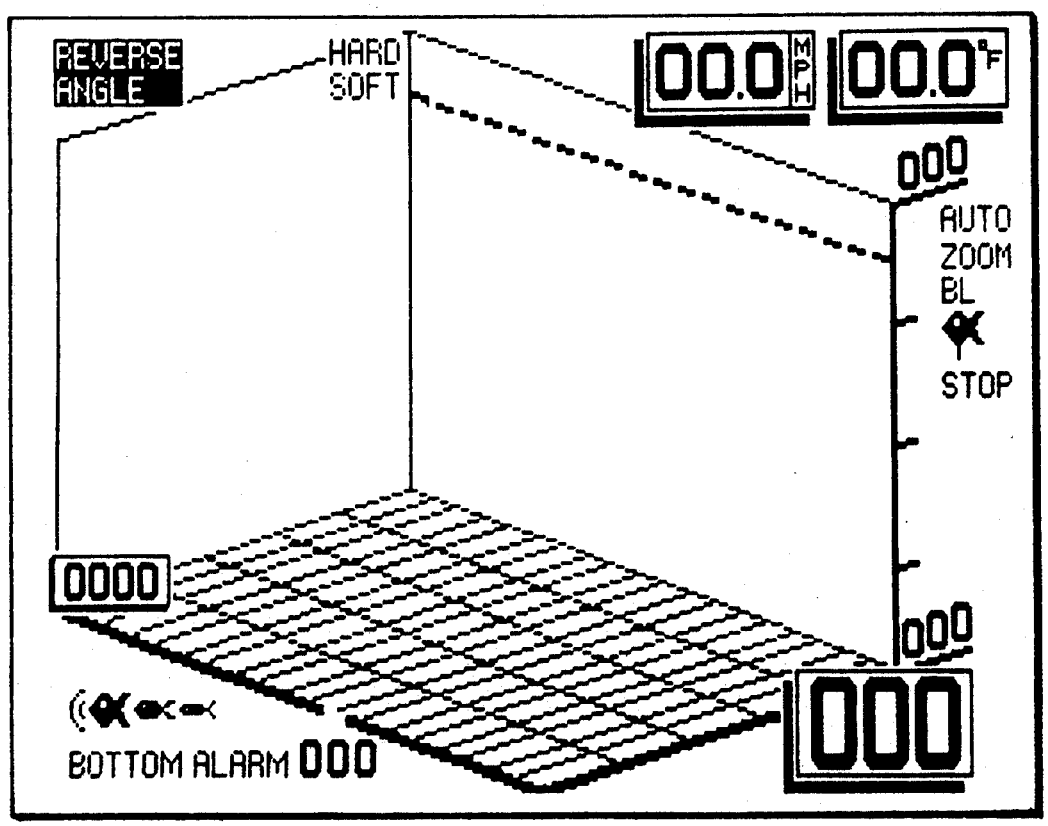
FIG. 8 illustrates the on-screen display of the present invention.

The general screen display capabilities are illustrated in FIG. 8. As shown, the underwater image shows the bottom of the body of water and any objects between the bottom and the boat. In addition, the screen gives indications of bottom hardness, distance back, boat speed, surface temperature, depth range and digital depth. Furthermore, other display capabilities include a reverse angle, a fish alarm, a bottom alarm, an automatic range control as well as a zoom feature and a bottom lock feature. Each of these capabilities will be discussed in greater detail below.

Figure 9:
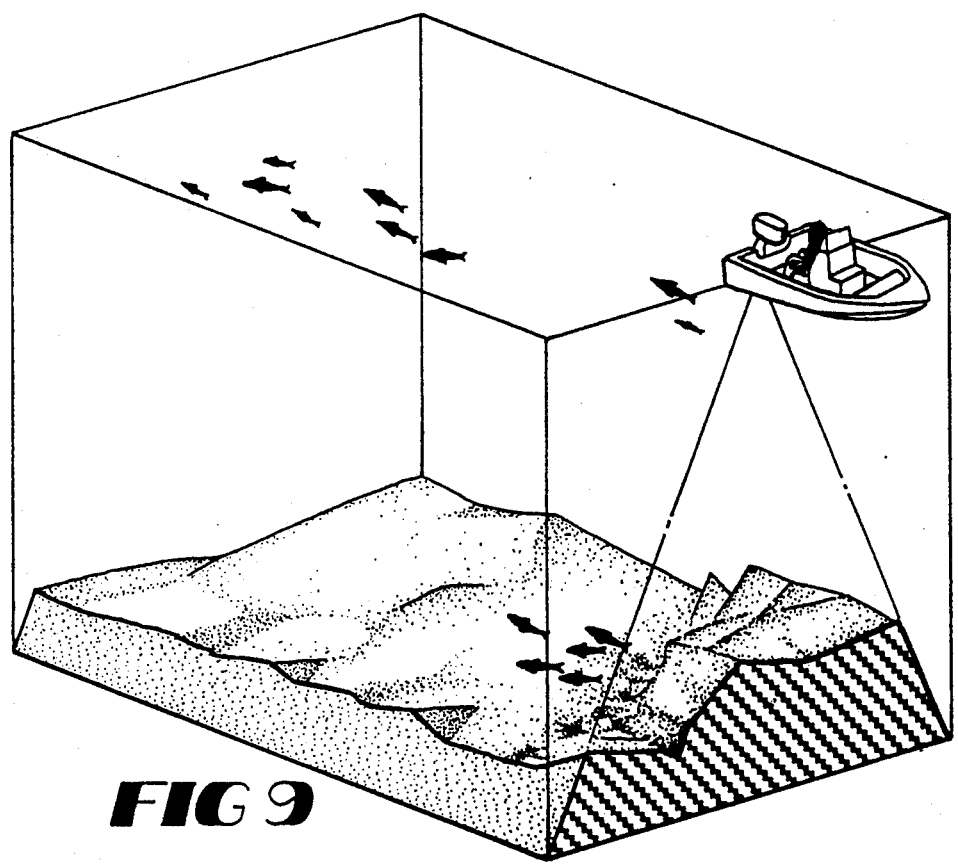
FIG. 9 depicts an actual on-screen display of the present invention in operation.

The sonar depth sounder of the present invention interprets the sonar returns to assemble the image displayed on the screen. As the operator views the image, the image orientation is such that the boat in at the center of the leading edge, traveling towards the right, as shown in FIG. 9.

Figure 10:
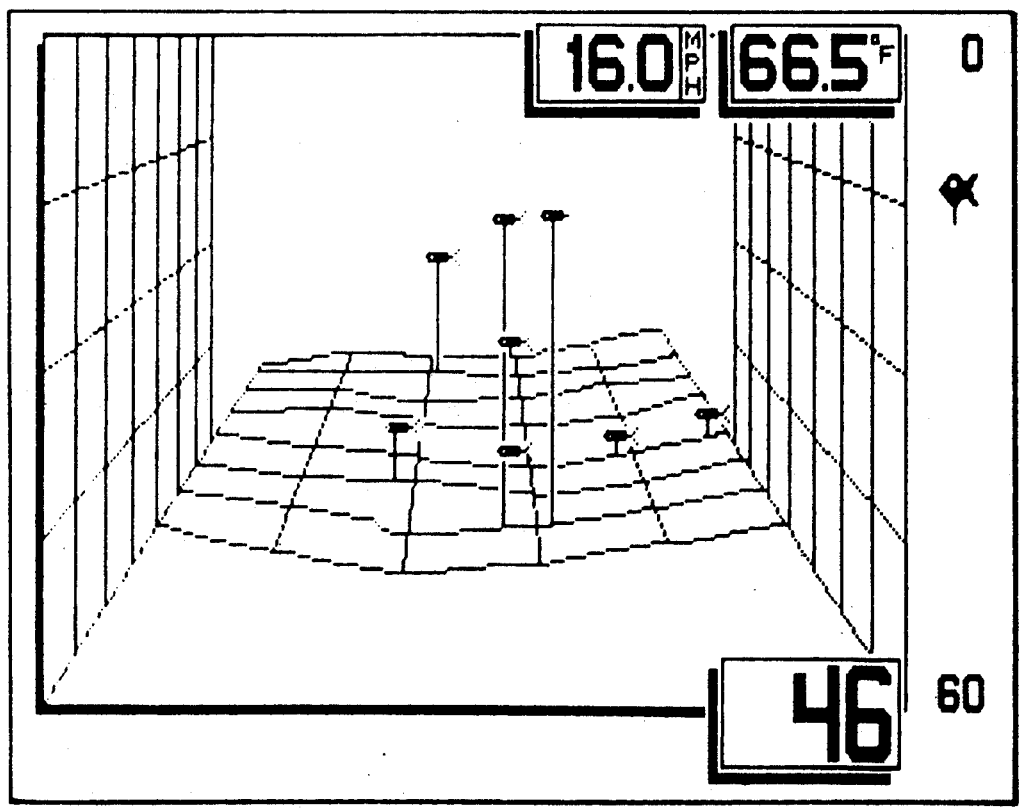
FIG. 10 illustrates the three-quarter view of the present invention.
Figure 11:
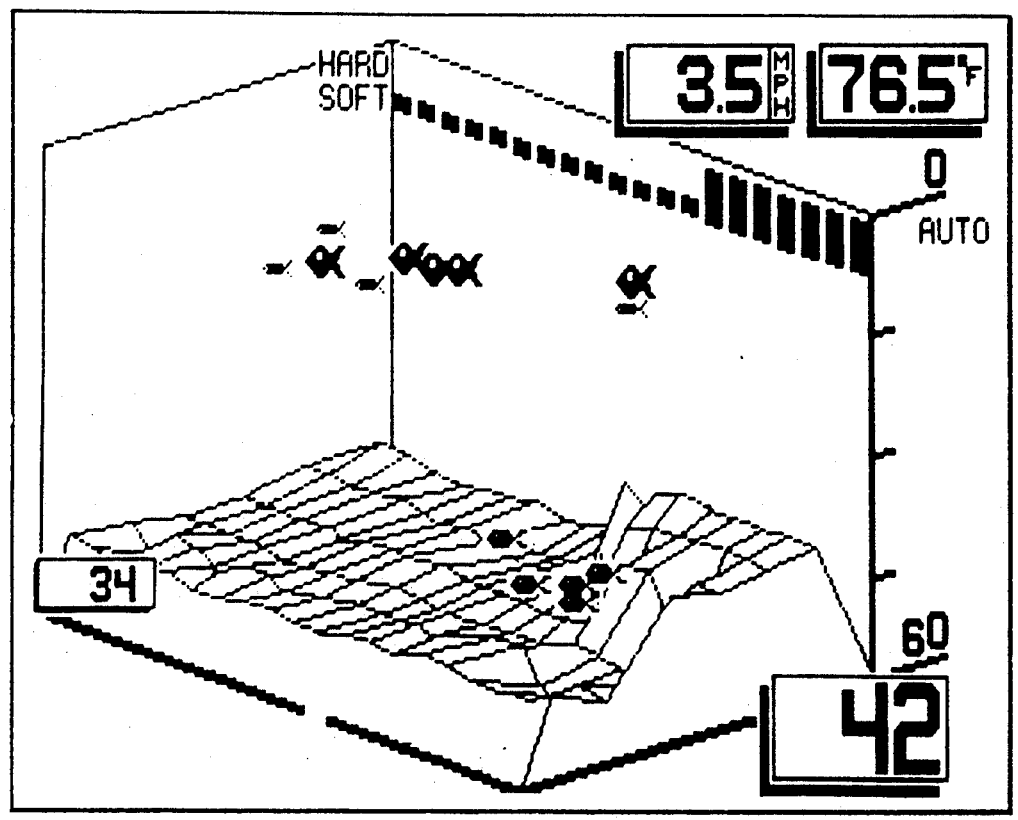
FIG. 11 illustrates the straight-on view of the present invention.
Figure 12:
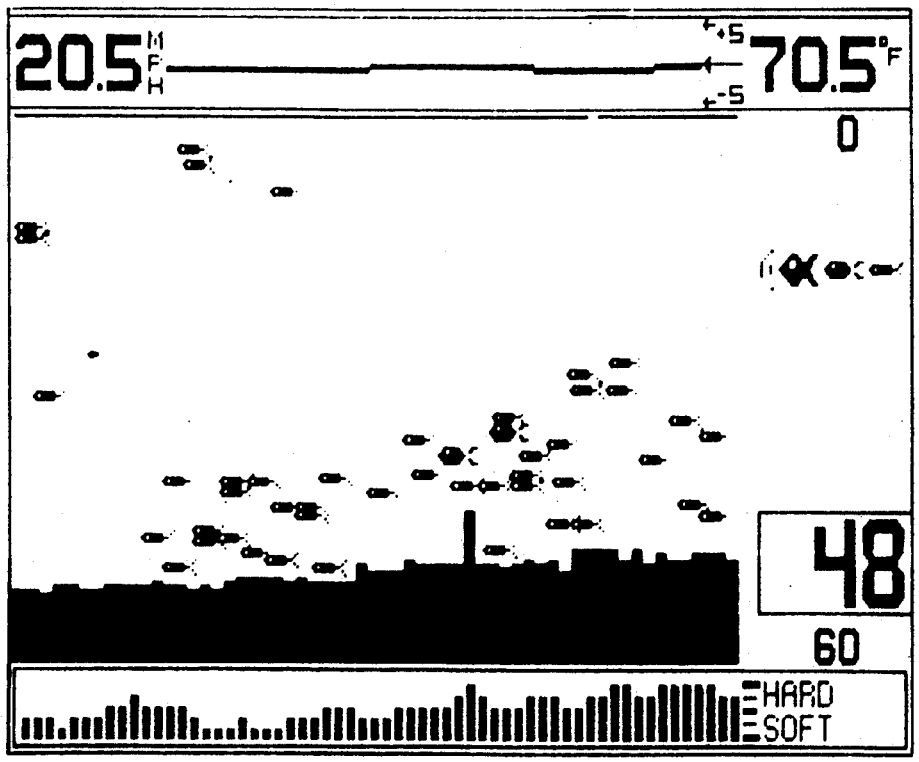
FIG. 12 illustrates the side view of the present invention.

Various display modes such as the ¾ View shown in FIG. 10, the straight-on view shown in FIG. 11, and the side view shown in FIG. 12, are selectable by the user and will be disclosed in greater detail below. The display advances across the screen as the boat moves across the water. The display speed is adjustable by means of the up and down arrow buttons and Display Speed menu selection. Higher display speeds provide faster updates while slower display speeds provide more historical information. Display speed affects how much "history" is shown. FIGS. 10, 11 and 15–23 show a grid defining the bottom surface. The grid consists of equally spaced parallel surface lines in the direction of boat travel and equally spaced parallel surface lines perpendicular to the line of travel of the boat. As can be seen in the figures, the display of the grid as projected on the bottom surface enables a clearly understandable display of the contours of the bottom surface.

Figure 13:
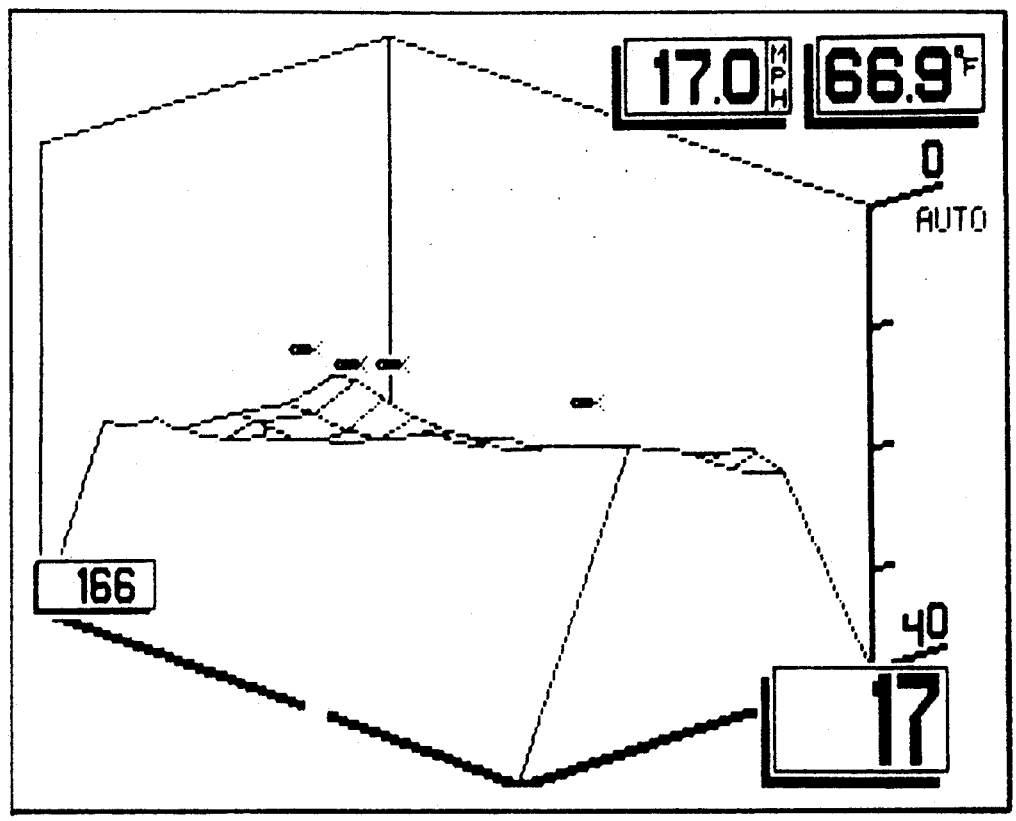
FIG. 13 illustrates a reverse angle view of the present invention.
Figure 14:
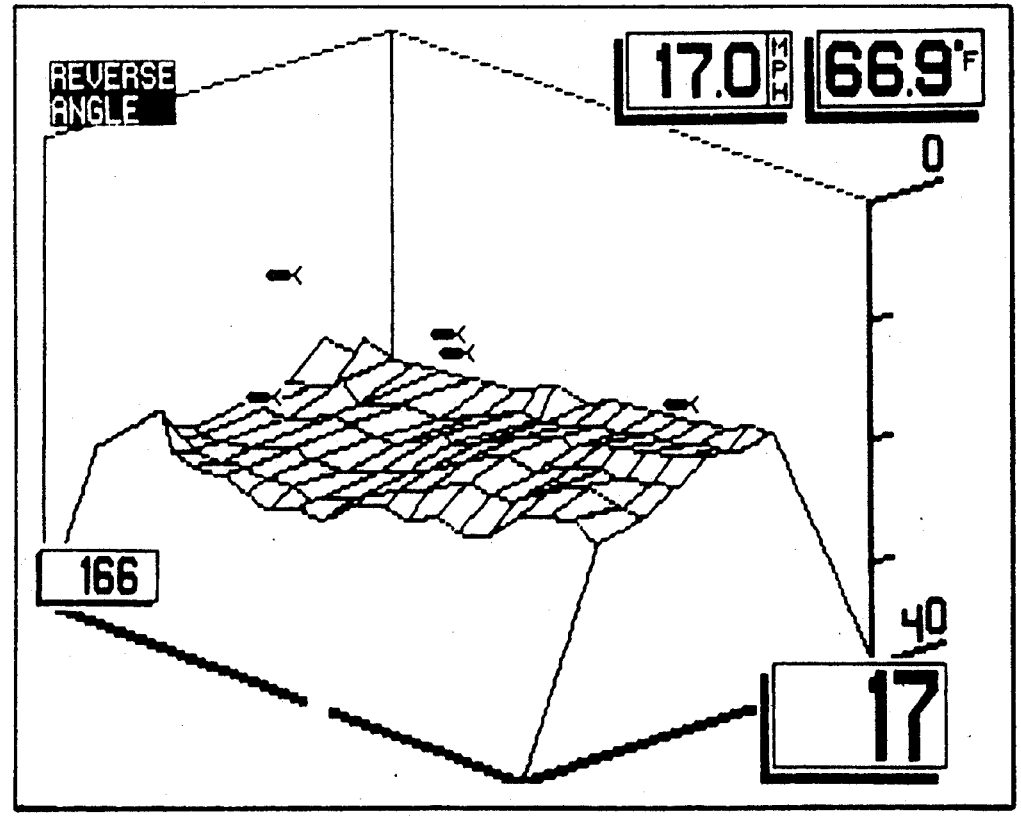
FIG. 14 illustrates the portion normally blocked by the reverse angle view of FIG. 13.
Figure 15:
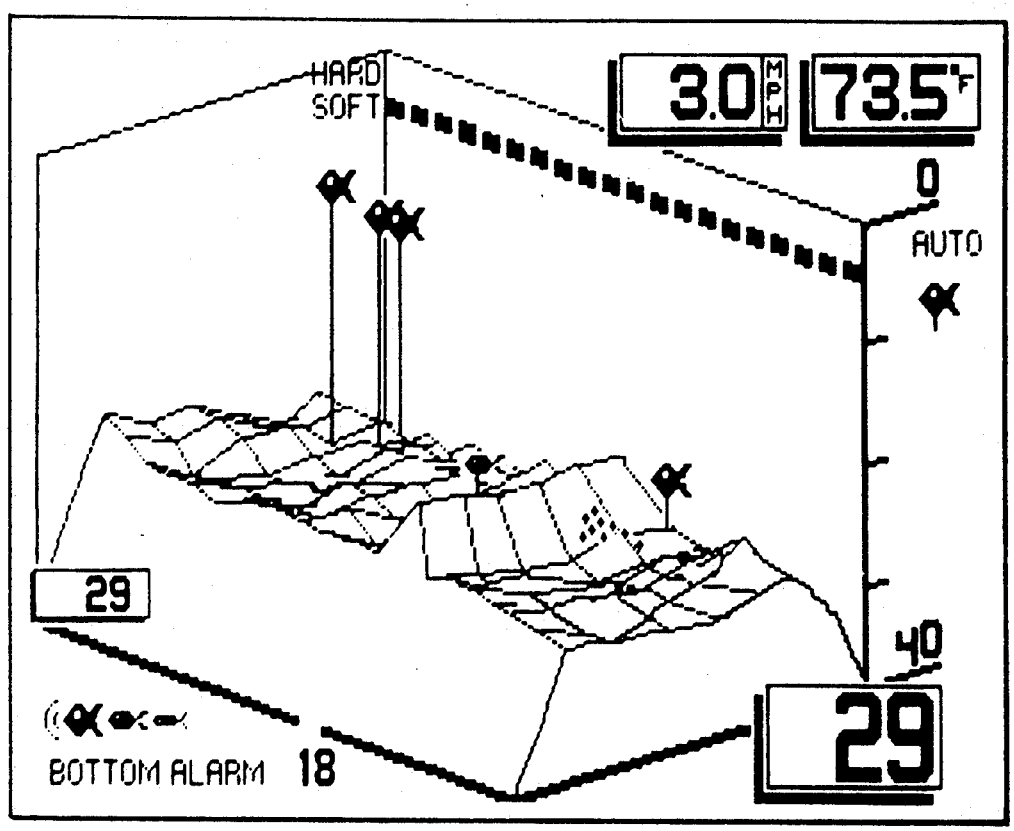
FIG. 15 illustrates the fish location capability of the present invention.

FIG. 13 depicts a display screen sharing a high bank on the bottom of the body of water which blocks the direct view of the bottom surface. FIG. 14 illustrates how the activation of the reverse angle feature shows the operator the portion of the bottom that would normally blocked. FIG. 15 illustrates the present system's use of three sizes of fish symbols to depict the presence of fish. FIG. 15 also shows the identification symbol "+" used for structure of thermoclines or weak signals. The ID feature allows the fish symbol to be "tied" to the bottom directly beneath the fish for easy location.

Up to 240 targets can be displayed along with numeric indications of water temperature, boat speed, water depth, distance from front to back of display and depth scales.

The primary output device of the preferred embodiment is a super-twist liquid crystal display. Such an LCD provides wider viewing angle and higher contrast, as well as higher operating temperature ranges than presently used LCD screens. Contrast can also be manually adjusted for optimum viewing.

A copy of the image data is kept in fast SRAM, where it can be quickly updated. When image edits are complete the new image data is transferred to the LCD controller in a burst-type transfer rather than a pixel by pixel line drawing approach.

An audio output is provided which, under control of the microprocessor, will alert the user to the occurrence of a preselected set of alarm conditions. In the preferred embodiment a Bottom Alarm facility (BAF) and a Fish Alarm facility (FAF) are provided.

The Bottom Alarm facility (BAF) receives control information from the user by means of menu operations which in turn are controlled by the up and down arrow buttons and ON-OFF buttons. The BAF also receives depth information from the IPS. A Bottom Alarm indicator and the selected depth are displayed by the LCD when this function is activated. While activated, the BAF will generate a continuous chirping sound whenever detected depth is less than the selected minimum.

The Fish Alarm facility (FAF) operates in essentially the same manner as the BAF. However, rather than basing FAF output on depth, fish detection status is received from the IPS. When fish in a preselected size range are detected the FAF outputs a chirping sound.

To activate the disclosed embodiments, a user depresses the POWER button. The apparatus always activates in the automatic mode. In the automatic mode, the device will find the bottom and select the proper depth range for a satisfactory return. Also, in the two-dimensional mode of operation, the display below the bottom line (BL) is blacked out to make the display easier to read.

In the automatic mode, the proper depth range is found as soon as the apparatus is turned on. As the apparatus is moved into deeper water and the bottom goes off the screen, the next deeper depth range will automatically be activated. In the event the user attempts to change to a depth scale which is less than the actual bottom depth, the control computer will automatically change the depth scale back to the proper depth. For example, if the user is in forty feet of water and changes the depth scale to twenty feet, the computer will automatically change back to the sixty foot scale.

In the "manual" mode, the automatic range or scale change is not operative. This means that a user must manually set the depth scale. For example, if a user is on the 0–40' scale and the bottom goes from thirty-five to forty-five feet, the user would press the down arrow button once to go from the 0–40' scale to the 0–60' scale. The bottom would then be displayed at forty-five feet.

Because of the operation of the automatic screen reformatting feature, information is automatically being stored in memory in smaller increments than is being displayed on the normal depth scales. For example, even though a user may have initially selected the 0–120' scale, when a change is made to the 0–20' scale, the information will be displayed as if the user had been on the 0–20' scale all along. Accordingly, no information or resolution is lost.

The LIGHT switch activates the display light for night or low light conditions. The present invention provides three levels of light control, including a dim setting, a bright setting and a off setting.

The sonar depth sounder of the present invention provides the operator with a variety of different features and functions to utilize. When the operator presses the SELECT button illustrated in FIG. 7, a menu appears on the screen offering the operator to select any of the following functions for further adjustments to the image presently displayed:

| | |
|---|---|
| Sensitivity | Bottom lock |
| Depth range | Bottom hardness |
| Bottom alarm | Display speed |
| Fish alarm | Data log |

-continued

| |
|---|
| Zoom |

To adjust the image by any of the above functions, the operator may press the SELECT button until the desired menu appears describing the particular function selected. The list rotates by one choice each time the SELECT button is pressed.

As the operator selects various functions, instructions appear on the display screen to assist the operator in using the arrow buttons and the ON-OFF button to achieve the desired adjustment to the image. The menu select system of the present invention works in all three views described above and shown in FIGS. 10–12.

Figure 16:
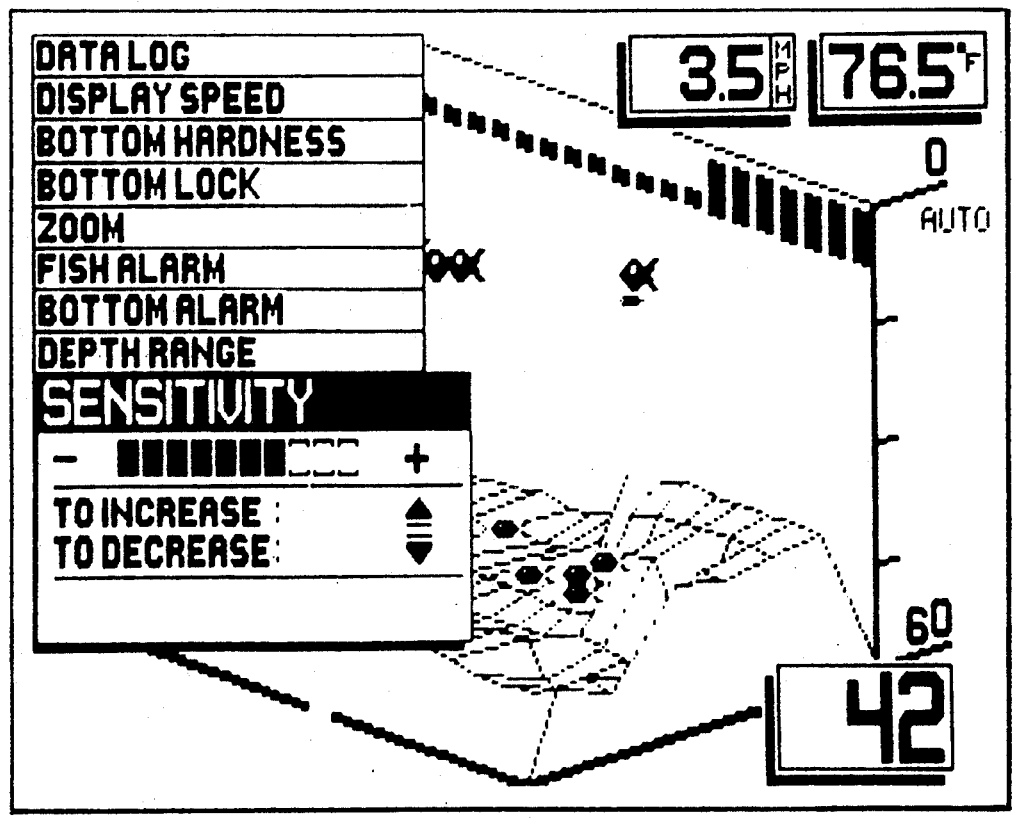
FIG. 16 depicts the menu of the select system of the present invention to adjust the sensitivity.

FIG. 16 illustrates the image present on the display screen when the operator is adjusting the sensitivity control. The present invention normalizes targets according to depth. The sizes of targets that are shown can be adjusted by setting the level shown on the sensitivity screen. The higher the level the smaller the targets that can be shown. Increasing the sensitivity adjustment can cause the display of very small targets and thermoclines which might not be displayed at a lower setting.

Figure 17:
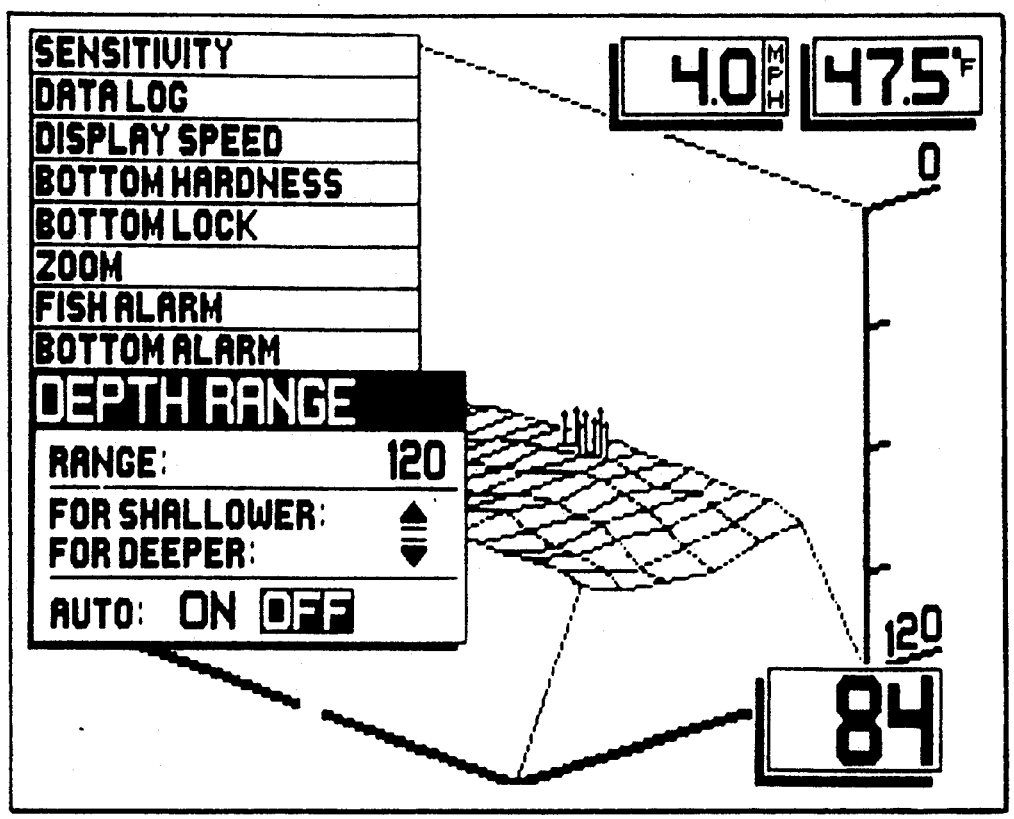
FIG. 17 depicts the menu of the select system of the present invention to adjust the depth range.

FIG. 17 illustrates the display screen of the present invention which allows an operator to adjust the depth range setting of the sonar device. When the system is turned on, the depth range setting is in the AUTO mode. As stated earlier, in the AUTO mode, the sonar system locates the bottom of the body of water, sets the ideal depth range and automatically adjusts this setting as the water depth changes.

However, if the operator prefers, the AUTO depth range can be turned off by pressing the ON-OFF button. After deactivating the AUTO depth range, the operator may manually adjust the depth range setting by depressing the up and down arrow buttons. Depending on the particular embodiment of the present invention in operation, the depth range may be set up to 120' or 240'. In either embodiment, the display screen shows a flat grid if the bottom is below the depth selected by the operator.

Figure 18:
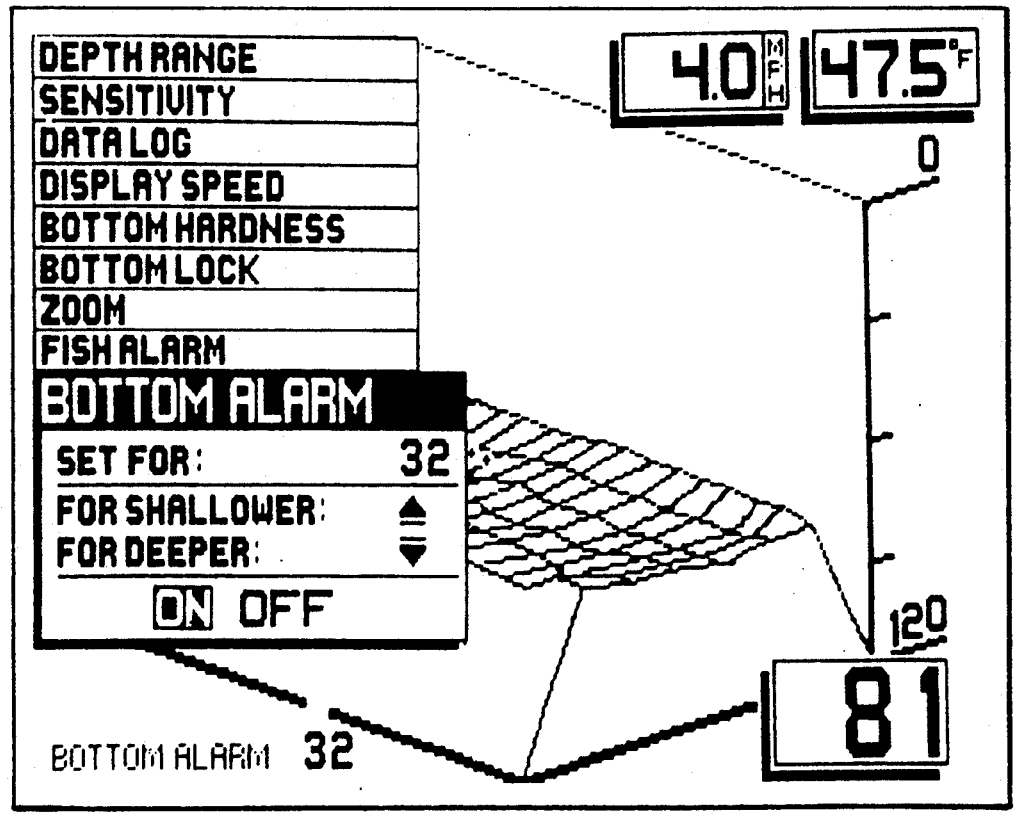
FIG. 18 depicts the menu of the select system of the present invention to adjust the bottom alarm.

The operator may specify the minimum depth he wishes to maintain by enabling the BOTTOM ALARM feature. As illustrated in FIG. 18, after an operator enables the BOTTOM ALARM feature by pressing the ON-OFF button, the up and down arrow buttons may be used to adjust the depth at which the alarm will sound. While the bottom alarm is enabled, the operator will hear a continuous chirping sound when the button directly under the boat becomes shallower than the setting defined. The BOTTOM ALARM feature may be used to alert the operator of shallow water or assist the operator in maintaining his position above an underwater structure.

Figure 19:
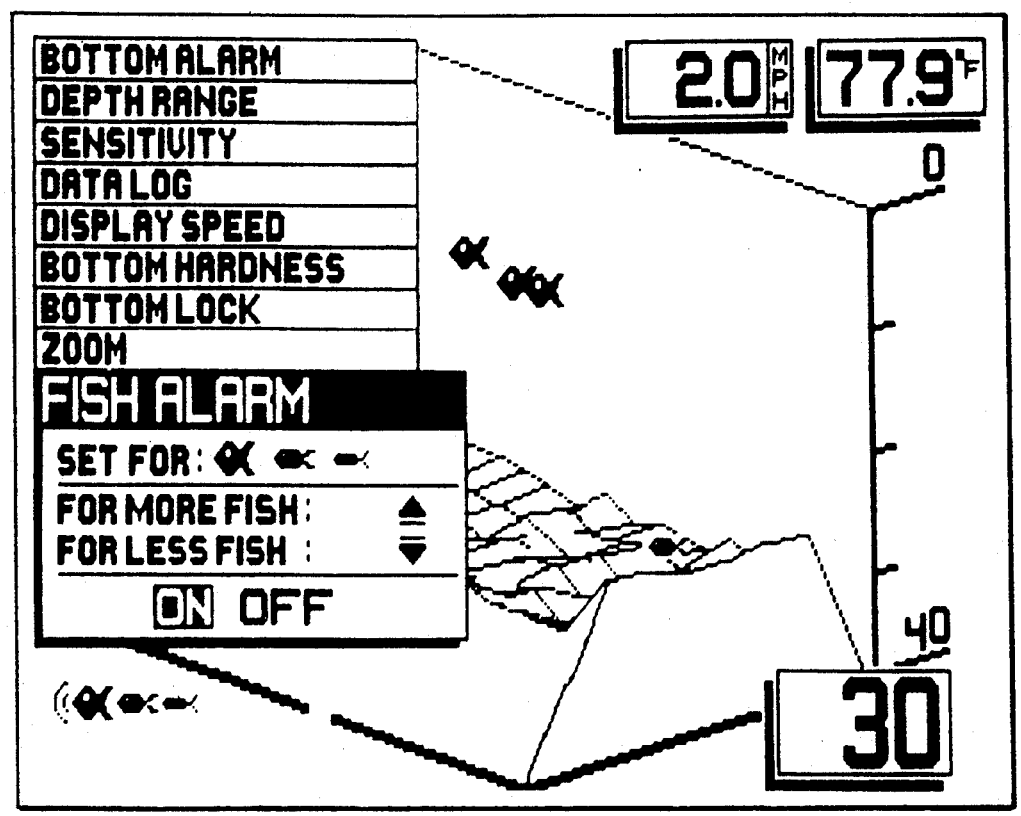
FIG. 19 depicts the menu of the select system of the present invention to adjust the fish alarm.

An additional feature of the present invention similar to the BOTTOM ALARM is the FISH ALARM. FIG. 19 depicts the display screen used to adjust the ability of the system to detect fish or other objects located between the boat and the bottom of the body of water. The present system corrects the strength of the return signals based on depth, so that shallow fish do not appear larger than similarly sized fish located deeper in the body of water. Even though the fish sizes displayed generally indicate the relative fish size, it should be noted that different species of fish may have different sonar characteristics.

Figure 20:
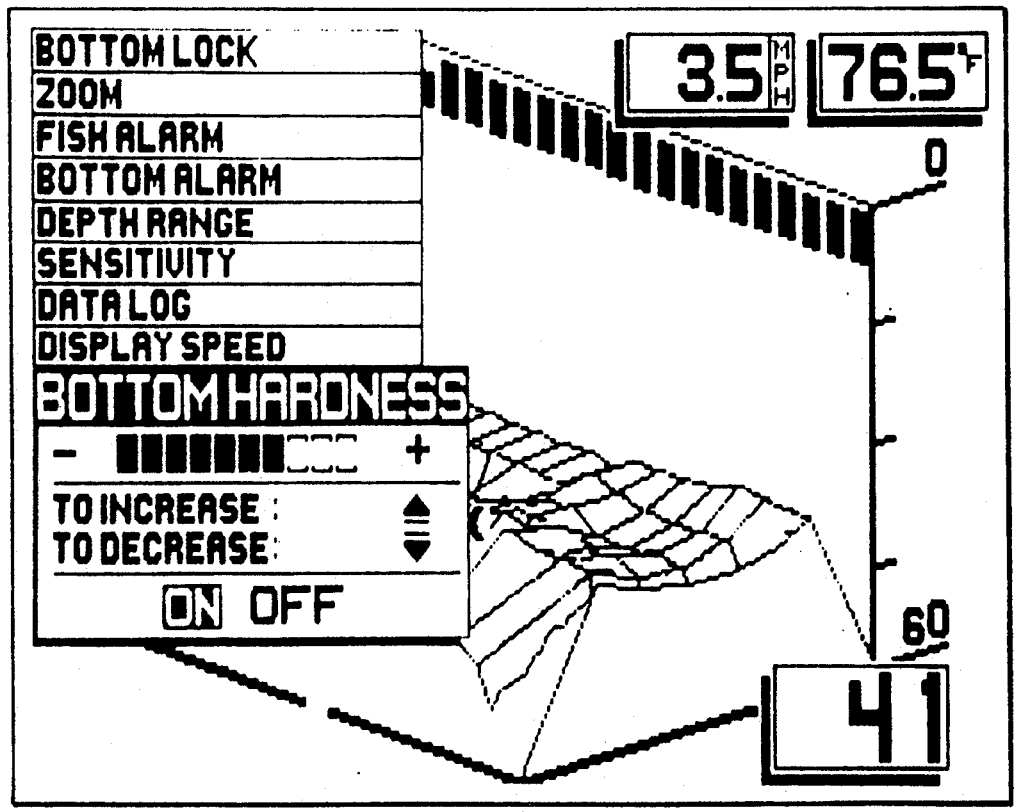
FIG. 20 depicts the menu of the select system of the present invention to adjust the bottom hardness.

FIG. 20 illustrates a special indicator located at the top of the display screen, utilized to show the relative hardness at the bottom surface of the body of water. Hard surfaces are indicated by full vertical bars, whereas, soft surfaces are indicated by shorter vertical bars. In the present invention, bottom-hardness is factory set for average bottom hardness to aid the operator in comparing unknown terrain.

Figure 21:
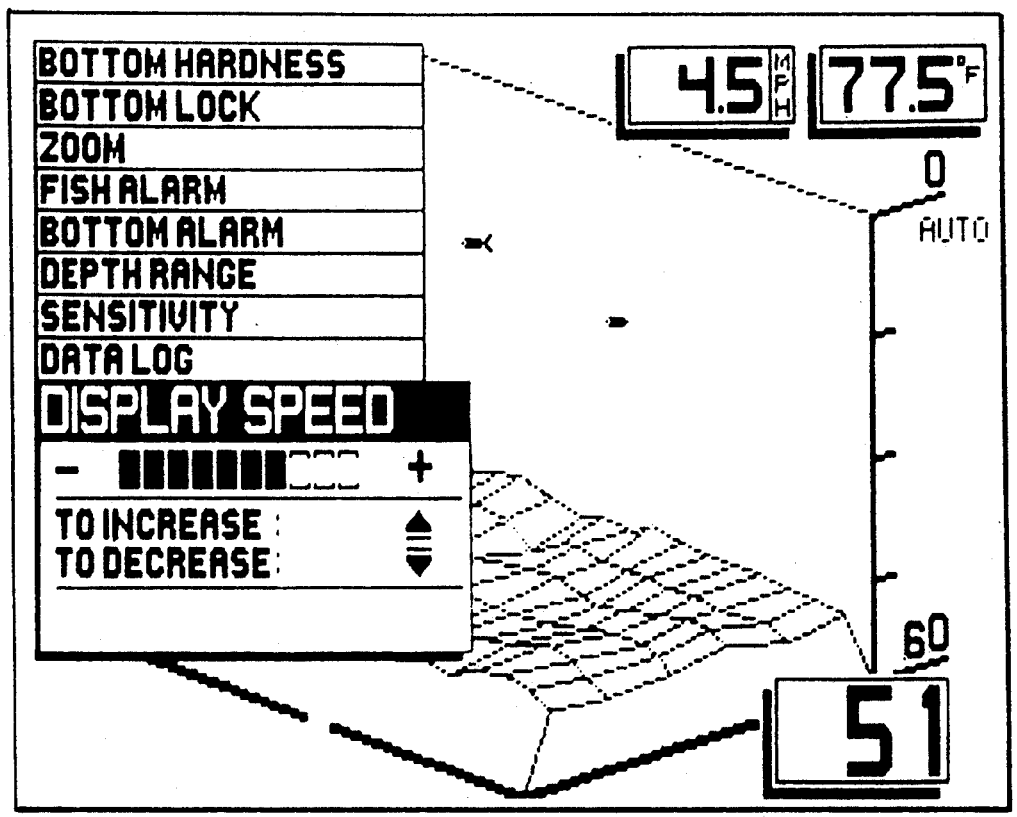
FIG. 21 depicts the menu of the select system of the present invention to adjust the display speed.

FIG. 21 depicts the present invention's capability of allowing the operator to adjust the speed at which the information shown on the display screen is updated as the boat moves across the water. In general, the higher the display speed setting, the faster the informational updates are provided, while slower display speed settings allow for more detailed information to be shown. Therefore, the display speed setting controls how much history relating to previously received signals is shown on the display screen.

Figure 22:
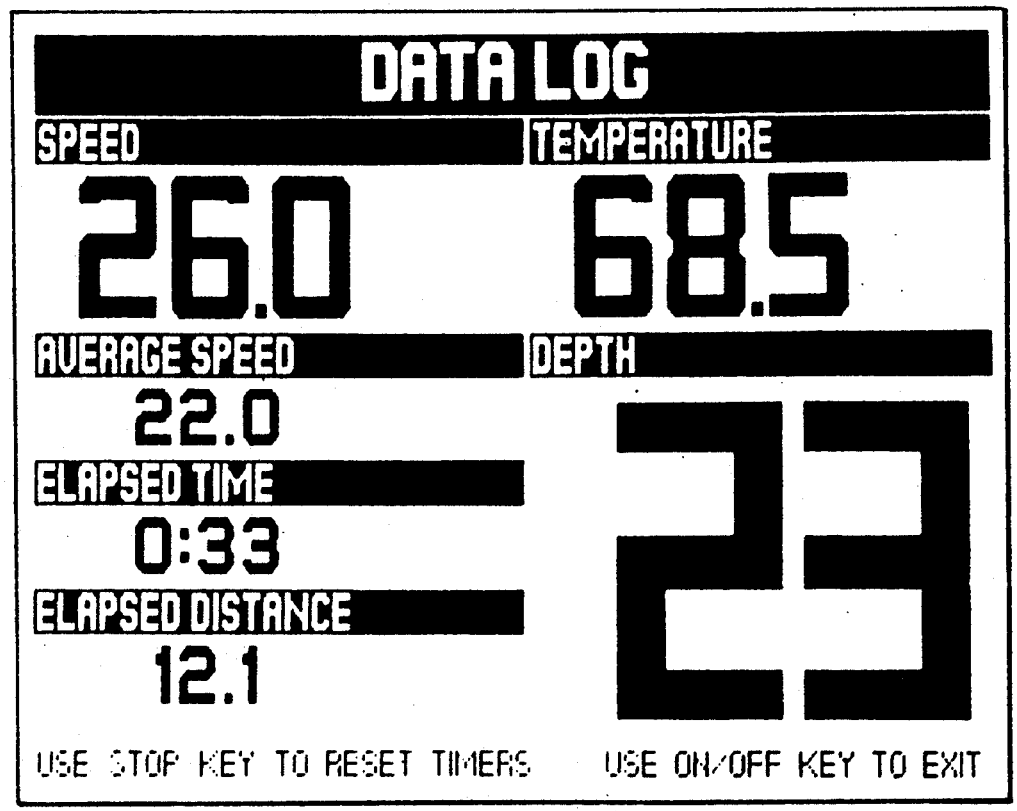
FIG. 22 illustrates the data log format of the present invention.

A full screen of information on the current operation conditions of the system is available via the Data Log feature, as shown in FIG. 22. In the present invention, all log information is continuously updated as long as the sonar system remains powered on. The operator may reset Average Speed, Elapsed Time and Elapsed Distance by pressing the STOP button.

Figure 23:
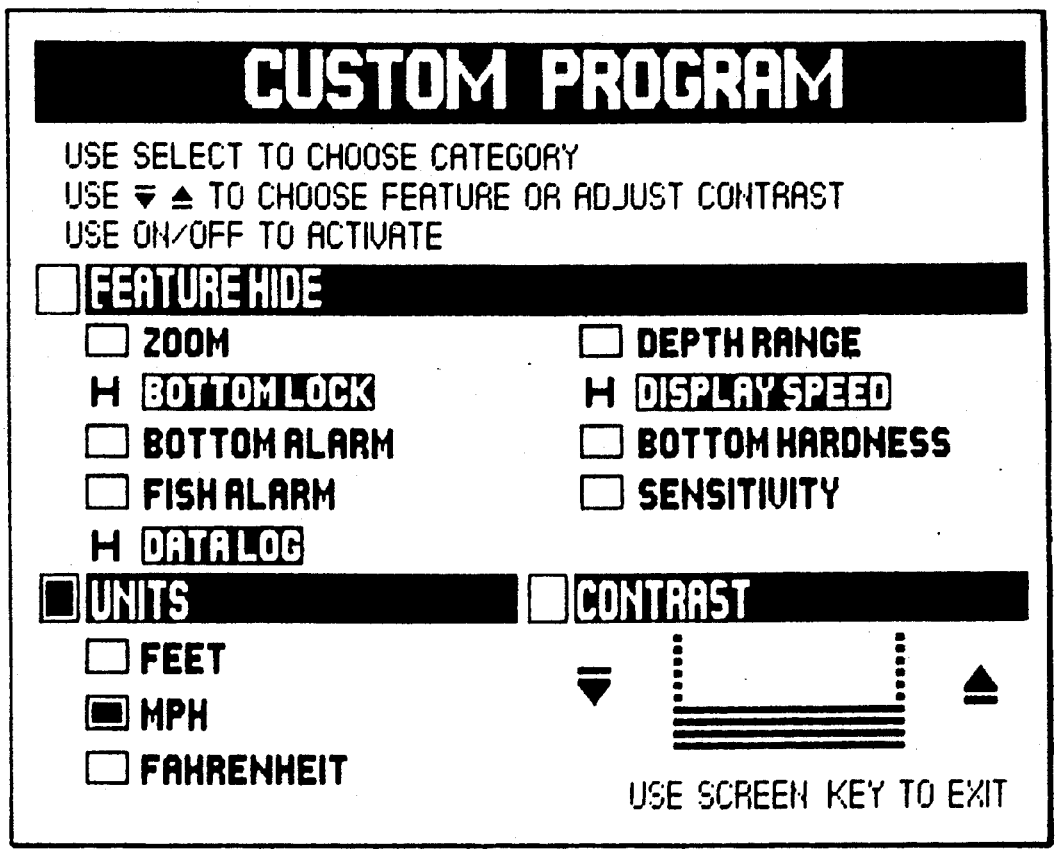
FIG. 23 illustrates the custom program format of the present invention.

Another feature of the present invention allows the operator to customize the menu displaying the various features within the select system of this device. Using the Custom Program feature, as illustrated in FIG. 23, the operator may "hide" from the select system any feature not frequently selected. Therefore, when the SELECT button is subsequently pressed, only those features the operator uses frequently will appear for further adjustment. In addition, the operator may choose whether distances are measured in feet or meters; whether speed is shown as miles per hour, kilometers per hour or knots; and whether temperatures are displayed in the fahrenheit or centigrade scale.

While this invention has been described in detail with particular reference to the preferred embodiment thereof, it will be understood that variations and modifications can be effected with the spirit and scope of the invention as previously described and as defined in the claims.

What is claimed is:

1. A sonar depth sounder apparatus comprising:
   a transducer with at least two elements, which produce a series of sonar signals, wherein the elements emit sonar signals toward the bottom surface of a body of water;
   at least two receivers capable of receiving returned sonar signals which have been reflected back toward the transducer elements by the bottom surface of the body of water;
   a microprocessor for analyzing the returned sonar signals and generating information regarding the contour of the bottom surface of the body of water; and
   a visual display for displaying the information regarding the contour of the bottom surface of the body of water, wherein said display is capable of depicting a plurality of different three-dimensional views of the bottom surface of the body of water.

2. A sonar depth sounder apparatus comprising:
   a transducer with at least two elements that produce a series of sound waves, wherein the sound waves from each element are emitted toward the bottom surface of a body of water in conically-shaped sound beams such that each conically-shaped sound beam generated from an element at least partially overlaps at least one other sound beam generated by a different element of said transducer, and wherein said elements receive corresponding echoes reflected off of objects in the path of said sound waves and generate signals corresponding to the receipt and strength of said reflected sound waves;
   means for controlling the generation of sound waves by said transducer;
   means for processing the signals generated by said transducer in response to the reflected sound waves; and
   a microprocessor for analyzing the processed signals and generating information regarding the contour of the bottom surface of the body of water and the location of other objects in the path of the sound beam.

3. The sonar depth sounder of claim 2, wherein the microprocessor utilizes the processed signals from overlapping sound beams to assist in determining the location of objects, such as fish, in the range of the sound beams.

4. The sonar depth sounder of claim 2, wherein the microprocessor utilizes the processed signals from overlapping sound beams to assist in determining the relative size of objects, such as fish, detected by the transducers, so that the sizes will be consistent independent of the depth of the object or its angular location within the sound beam.

5. The sonar depth sounder of claim 4, which further comprises a visual display upon which detected fish are displayed by symbols which designate at least two relative sizes of fish.

6. A sonar depth sounder apparatus comprising:
   a transducer with at least two elements, which produce a series of sonar signals, wherein the elements emit sonar signals toward the bottom surface of a body of water;
   at least two receivers capable of receiving returned sonar signals which have been reflected back toward the transducer elements by the bottom surface of the body of water;
   a microprocessor for analyzing the returned sonar signals and generating information regarding the contour of the bottom surface of the body of water;
   a visual display for displaying the information regarding the contour of the bottom surface of the body of water;
   wherein a three-dimensional view of the bottom surface is displayed in a grid line format, wherein the grid comprises a horizontal plane of first spaced parallel surface lines and second spaced parallel surface lines perpendicular to said first spaced parallel lines projected onto the bottom surface.

7. The sonar depth sounder of claim 6 wherein objects detected above the bottom surface are displayed along with a vertical line from the object to a grid line, to aid a viewer of the display in the perception of where the object is located with respect to the bottom surface.

* * * * *